United States Patent
Ohmuro (10) Patent No.: US 10,557,708 B2
(45) Date of Patent: Feb. 11, 2020

(54) RANGE FINDER

(71) Applicant: NIKON VISION CO., LTD., Tokyo (JP)

(72) Inventor: Hitoshi Ohmuro, Tokyo (JP)

(73) Assignee: NIKON VISION CO., LTD., Tokyo (JP)

(*) Notice: Subject to any disclaimer, the term of this patent is extended or adjusted under 35 U.S.C. 154(b) by 432 days.

(21) Appl. No.: 15/444,089

(22) Filed: Feb. 27, 2017

(65) Prior Publication Data

US 2017/0167867 A1 Jun. 15, 2017

Related U.S. Application Data (63) Continuation of application No. PCT/JP2014/004401, filed on Aug. 27, 2014.

(51) Int. Cl.
*G01B 11/02* (2006.01)
*G01C 3/06* (2006.01)
(Continued)

(52) U.S. Cl.
CPC .............. *G01C 3/06* (2013.01); *G01S 7/4814* (2013.01); *G01S 7/4816* (2013.01);
(Continued)

(58) Field of Classification Search
CPC ......... G01C 3/06; G01S 17/10; G01S 7/4814; G01S 7/51; G01S 7/4865; G01S 7/497; G01S 7/4816
(Continued)

(56) References Cited

U.S. PATENT DOCUMENTS 9,835,718 B2* 12/2017 Mochizuki ............... G01C 3/06
2010/0157282 A1 6/2010 Arai et al.

FOREIGN PATENT DOCUMENTS

JP S63-281012 A 11/1988
JP 2006-317304 A 11/2006
(Continued)

OTHER PUBLICATIONS

Apr. 3, 2018 Office Action issued in Japanese Patent Application No. 2016-545086.
(Continued)

*Primary Examiner* — Mark Hellner
(74) *Attorney, Agent, or Firm* — Oliff PLC (57) ABSTRACT

A range finder including a sighting optical system that forms an optical image of a sighting target by sighting a target object and includes a correcting member in an optical path thereof that is driven to correct image blur of an optical image; a driving section that drives the correcting member based on a shaking amount applied to the sighting optical system; a light transmitting section that emits measurement light to a sighting target; a light receiving section that receives returned light from the sighting target and outputs a received light signal; a distance calculating section that calculates distance to the sighting target based on a timing when the measurement light is output and a timing when the return light is received by the light receiving section; and a power changing section that controls a focal distance of the light receiving section according to driving of the correcting member.

9 Claims, 7 Drawing Sheets

(51) Int. Cl.
  *G01S 7/497* (2006.01)
  *G01S 7/481* (2006.01)
  *G01S 7/51* (2006.01)
  *G01S 17/10* (2006.01)

(52) U.S. Cl.
  CPC ............ *G01S 7/4865* (2013.01); *G01S 7/497* (2013.01); *G01S 7/51* (2013.01); *G01S 17/10* (2013.01)

(58) Field of Classification Search
  USPC ........................................................ 356/501
  See application file for complete search history.

(56) References Cited

FOREIGN PATENT DOCUMENTS

| JP | 2009-270856 A | 11/2009 | | |
| JP | 2009270856 A | * 11/2009 | ............... | G01C 3/06 |
| JP | 0201466724 A | * 4/2014 | ............... | G01C 3/06 |
| WO | 2009/031550 A1 | 3/2009 | | |

OTHER PUBLICATIONS

Feb. 28, 2017 International Preliminary Report on Patentability issued in International Patent Application No. PCT/JP2014/004401.
Nov. 25, 2014 International Search Report issued in International Patent Application No. PCT/JP2014/004401.

* cited by examiner

RANGE FINDER

BACKGROUND

1. Technical Field

The present invention relates to a range finder.

2. Related Art

A measurement apparatus is known that includes a variable power optical system in a light receiving optical system, as shown in Patent Document 1, for example. Patent Document 1: Japanese Patent Application Publication No. S63-281012

In a measurement apparatus having a variable power optical system, there are problems that the S/N ratio becomes small and the laser light cannot enter into the light receiving region, due to the relationship between the power rate and the parallax.

SUMMARY

According to a first aspect of the present invention, provided is a range finder comprising a sighting optical system that forms an optical image of a sighting target by sighting a target object and includes a correcting member in an optical path thereof that is driven to correct image blur of an optical image; a driving section that drives the correcting member based on a shaking amount applied to the sighting optical system; a light transmitting section that emits measurement light to a sighting target; a light receiving section that receives returned light from the sighting target and outputs a received light signal; a distance calculating section that calculates a distance to the sighting target based on a timing at which the measurement light is output and a timing at which the return light is received by the light receiving section; and a power changing section that controls a focal distance of the light receiving section according to driving of the correcting member.

According to a second aspect of the present invention, provided is a range finder comprising a sighting optical system that forms an optical image of a sighting target by sighting a target object; a light transmitting section that emits measurement light to a sighting target; a light receiving section that receives returned light from the sighting target and outputs a received light signal; a distance calculating section that calculates a distance to the sighting target based on a timing at which the measurement light is output and a timing at which the return light is received by the light receiving section; a power changing section that controls a focal distance of the light receiving section based on the received light signal input to the distance calculating section; and a control section that causes the distance calculating section to calculate and output the distance based on the received light signal that is input again after the control section controls a focal distance of the light receiving section using the power changing section.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
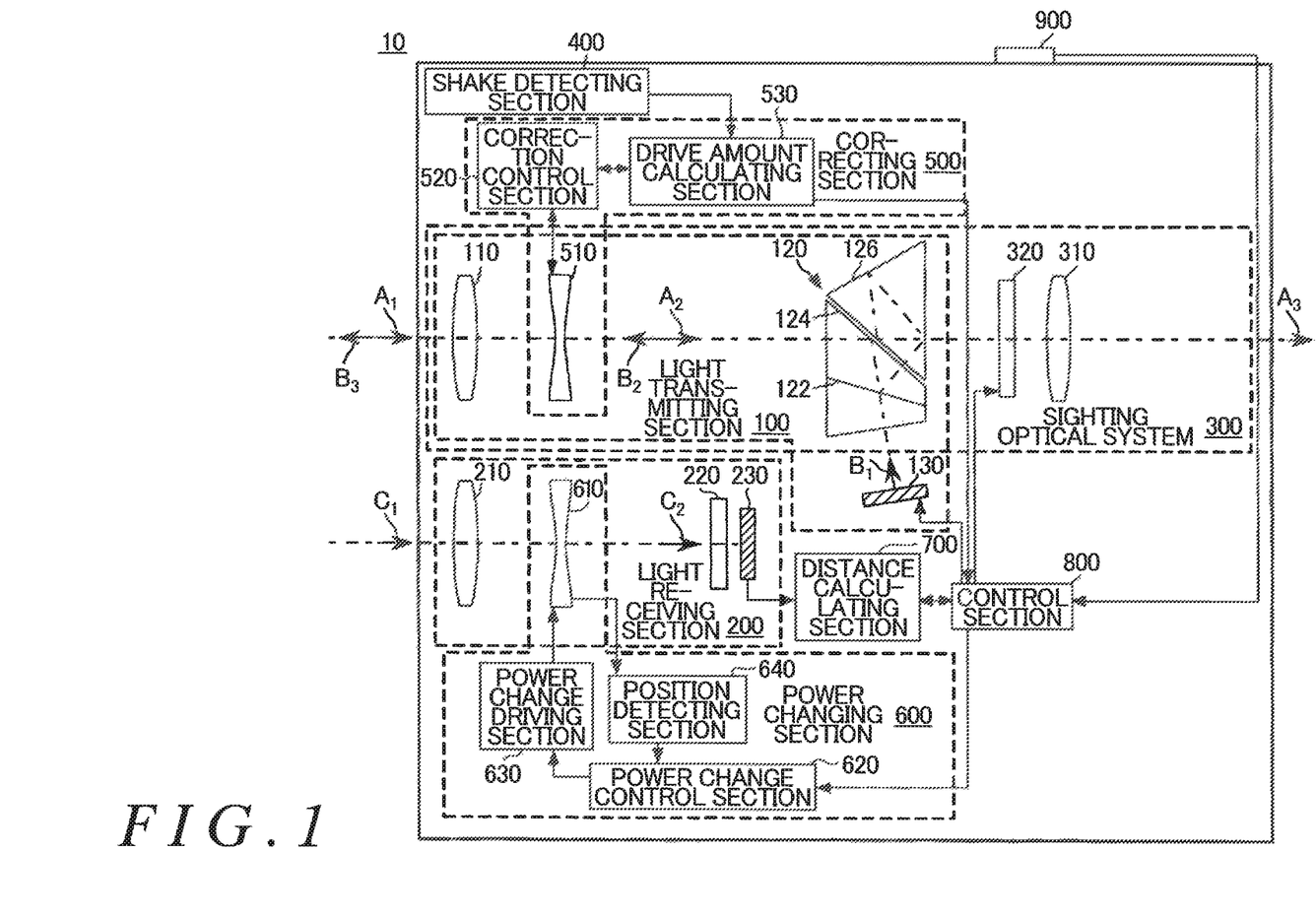
FIG. 1 is a block diagram of a range finder 10.

FIG. 1 is a block diagram of a range finder 10 according to a first embodiment of the present invention. The range finder 10 includes a light transmitting section 100, a light receiving section 200, a sighting optical system 300, a shake detecting section 400, a correcting section 500, a power changing section 600, a distance calculating section 700, a control section 800, and a distance measurement button 900.

The light transmitting section 100 emits measurement light to a sighting target. The light transmitting section 100 includes an objective lens 110, a correcting lens 510, an erecting prism 120, and a light emitting section 130. In the following description, the direction in which the light transmitting section 100 emits the measurement light in the range finder 10, i.e. the direction of the arrow of the light beam $B_3$ in the drawing, is referred to as the forward direction. In the following description, the sighting target is sometimes referred to as a target object.

The light emitting section 130 emits the measurement light to be a predetermined number of pulses per unit time. In this case, the light emitting section 130 emits hundreds to thousands of pulses of light per second, for example, as the measurement light. As one example, the light emitting section 130 is a semiconductor laser that oscillates infrared rays. The following description uses an example in which the light emitting section 130 emits measurement light in the infrared region.

The erecting prism 120 includes a dichroic reflective surface 122 that reflects the visible light band and transparently passes the infrared band, and completely reflective surfaces 124 and 126 that have high reflectivity to the visible light band and also to the infrared band. The measurement light is transparently passed through the dichroic reflective surface 122, reflected at the completely reflective surface 124, and propagated in the forward direction within the range finder 10 as a light beam $B_2$. Furthermore, the erecting prism 120 uses the dichroic reflective surface 122, the completely reflective surfaces 124 and 126, and other reflective surfaces to invert the upside-down image formed by the incident light beam into an upright image. Examples of the erecting prism 120 include a roof prism, a Porro prism, and the like.

The objective lens 110 is arranged at the front end of the range finder 10, and the front-side end surface of the objective lens 110 faces the target object that is the distance measurement target. The back-side end surface of the objective lens 110 faces the front-side end surface of the erecting prism 120 in a manner to sandwich the correcting lens 510.

The light receiving section 200 receives returned light from the sighting target, converts this light into an electric signal, and outputs the result as a received light signal. The light receiving section 200 is an optical system that is independent from the light transmitting section 100 and the sighting optical system 300, and includes a light receiving lens 210, a power changing lens 610, a band transmission filter 220, and a light receiving element 230. In this way, the light receiving section 200 has a different optical axis than the light transmitting section 100 and the sighting optical system 300. In the following description, the optical system of the light receiving section is sometimes referred to as a light receiving optical system.

The power changing lens 610, the band transmission filter 220, and the light receiving element 230 are arranged in the stated order behind the light receiving lens 210. The band transmission filter 220 transparently passes light in a narrow wavelength band including the measurement light, and blocks or attenuates light in the other wavelength bands. Examples of the light receiving element 230 include a photodiode, phototransistor, and the like that are sensitive to the wavelength band of the measurement light. In consideration of eliminating the effect of background light on the measurement light, the light receiving area of the light receiving element 230 is preferably smaller.

In the light receiving section 200 described above, a light beam $C_1$ that has been reflected or scattered from the target object positioned in front of the range finder 10 is incident to the light receiving lens 210. The light beam $C_1$ is gathered by the light receiving lens 210 and propagated toward the back as a light beam and is received by the light receiving element 230 after passing through the band transmission filter 220.

The light receiving element 230 converts the received light signal into an electric signal corresponding to the intensity. The light receiving element 230 outputs this electric signal to the distance calculating section 700.

The distance calculating section 700 calculates the distance to the target object based on the timing at which the measurement light was output and the timing at which the light receiving section 200 received the incident light. The distance calculating section 700 includes an amplifier, a binarization circuit, a sampling circuit, a counter circuit, an oscillator, and the like. The distance calculating section 700 performs an amplification process on the electric signal output from the light receiving element 230, using the amplifier. The distance calculating section 700 uses a predetermined threshold value in the binarization circuit to convert the electric signal that has undergone the amplification process into a binary signal. Furthermore, the distance calculating section 700 performs digital sampling on the binary signal using the sampling circuit, to generate a received light signal in synchronization with the sampling clock of the oscillator.

The distance calculating section 700 calculates a time difference between the time at which the light emitting section 130 emitted the light pulse and the time at which the light receiving element 230 received the incident light that has been reflected or the like from the target object, according to the count value of the sampling clock in the pulse of the received light signal. The distance calculating section 700 sequentially performs the time difference calculation process for each light pulse in the measurement light. Every time the time difference of the pulse in the received light signal is calculated, a signal value is integrated at a memory address corresponding to this time difference in an internal memory. In this way, a histogram for distance calculation is generated. When this process has ended for a received light signal corresponding to a predetermined number of light pulses, the distance calculating section 700 specifies the memory address having the largest integrated value. The distance calculating section 700 identifies the time difference $\Delta t$ corresponding to this memory address to be the time difference of the transmitted and received light corresponding to the target object.

The distance calculating section 700 calculates the distance to the target object based on this identified time difference $\Delta t$. Specifically, the distance calculating section 700 converts this time difference into a distance using the expression shown below.

$$l = c \times \Delta t / 2$$

Here, l is the distance to the target object and c is the speed of light. The distance calculating section 700 transmits information concerning the calculated distance l to the target object to the control section 800. The control section 800 shows the information concerning the distance to the target object and the like obtained by the distance calculating section 700 to a user, with characters, images, or the like in the reticle plate 320.

The sighting optical system 300 forms an optical image of the sighting target, by sighting the target object. The sighting optical system 300 includes a reticle plate 320 and an eyepiece lens 310. The sighting optical system 300 further shares the objective lens 110, the correcting lens 510, and the erecting prism 120 with the light transmitting section 100. In this way, the light transmitting section 100 and the sighting optical system 300 appear to have the same optical axis. The user determines the sight for the target object by looking forward through the sighting optical system 300.

The reticle plate 320 is arranged at a focal position of the objective lens 110 of the light transmitting section 100. The front end of the eyepiece lens 310 faces the back end of the reticle plate 320 inside the range finder 10. The reticle plate 320 includes a sight mark and a display section. Examples of the shape of the sight mark include crossed lines, a rectangular frame, a circular frame, and the like. The display section shows the measurement results of the distance to the target object to the user, with characters, images, or the like by using transparent liquid crystals or the like.

In the light reflected or scattered from the target object positioned in front of the range finder 10, a light beam $A_1$ that propagates within a range of the viewing angle of the objective lens 110 is incident to the sighting optical system 300. The light beam $A_1$ is gathered by the objective lens 110 as a light beam $A_2$, and emitted toward the back of the range finder 10 through the erecting prism 120, the reticle plate 320, and the eyepiece lens 310 as a light beam $A_3$. In this way, the user views an upright normal image of the target object through the eyepiece lens 310.

The sight mark arranged on the reticle plate 320 is superimposed on the image of the target object viewed by the user through the eyepiece lens 310. Accordingly, the user sights on to the target object by orienting the range finder 10 such that the sight mark is superimposed on the image viewed through the eyepiece lens 310. In this case, since the light transmitting section 100 and the sighting optical system 300 appear to have matching optical axes as described above, the measurement light is irradiated at the position showing the sight mark.

The shake detecting section 400 includes a plurality of angular velocity sensors and the like having detection directions that intersect with each other, and detects shaking occurring in the range finder 10. The plurality of angular velocity sensors are arranged in a direction to detect pitching and yawing of the range finder 10, for example. Each angular velocity sensor outputs a shaking detection signal corresponding to the amount of displacement and including the direction and magnitude of the displacement as information, to the correcting section 500 and the control section 800, when the range finder 10 is displaced.

The correcting section 500 includes a correcting lens 510, a correction control section 520, and a drive amount calculating section 530. The correcting section 500 is arranged in the optical path of the sighting optical system 300 and, based on the shaking amount detected by the shake detecting section 400, corrects the optical axis of the sighting optical system 300 by driving the correcting lens 510 in order to correct image blur in the optical image of the sighting target formed by the sighting optical system 300.

Specifically, the drive amount calculating section 530 periodically references the output of the shake detecting section 400 and calculates the drive amount of the correcting lens 510. The drive amount calculating section 530 outputs a correction signal corresponding to this calculated drive amount to the correction control section 520, Furthermore, the drive amount calculating section 530 outputs this correction signal to the power change control section 620 via the control section 800. The correction control section 520 corrects the fluctuation of the optical axis occurring in the sighting optical system 300 by driving the correcting lens 510 with the drive amount corresponding to this correction signal. This drive amount includes information concerning direction and magnitude. In the following description, the operation for correcting the fluctuation of the optical axis occurring in the sighting optical system 300 is sometimes referred to as a hand shake correction operation. Furthermore, the displacement amount of the arrival position of the optical axis at the target object corresponding to the drive amount described above is sometimes referred to as the optical axis correction amount. This optical axis correction amount includes information concerning direction and magnitude.

In the present embodiment, the correction control section 520 functions as a position detecting section that detects the position of the correcting lens 510. The correction control section 520 periodically detects the position of the correcting lens 510. The correction control section 520 performs feedback control of the drive amount of the correcting lens 510 according to the detected position of the correcting lens 510. In this way, even when a disturbance is caused by an impact, vibration, or the like, the position of the correcting lens 510 can be accurately controlled.

The correcting section 500 may constantly perform the correction operation, or may perform the correction operation only during a period when the user is using the range finder 10. The use of the range finder 10 by the user may be detected by detecting an eye of the user peering through the eyepiece lens 310, for example, and the correcting section 500 may be turned ON and OFF accordingly. Alternatively, the correcting section 500 may start operating based on the user manipulating the distance measurement button 900.

After this, if no manipulations have been made by a user for at least a predetermined time, the operation of the correcting section 500 may be stopped.

The correcting lens 510 is driven by the correction control section 520 near the objective lens 110 to displace the optical path for each of the light beams $A_2$ and $B_2$. In this way, by displacing the correcting lens 510 in a manner to optically cancel out the displacement when the range finder 10 is displaced, it is possible to prevent blurring of the image viewed by the user. The correcting lens 510 is also used by the light transmitting section 100, and therefore it is possible to continue radiating the measurement light to the same target object even when the range finder 10 is displaced.

The power changing section 600 controls the focal distance of the light receiving optical system, according to the drive of the correcting lens 510. For example, the power changing section 600 controls the focal distance of the light receiving optical system based on the drive amount of the correcting lens 510 indicated by the correction signal from the drive amount calculating section 530. The power changing section 600 includes a power changing lens 610, a power change control section 620, a power change driving section 630, and a position detecting section 640.

A voice coil motor, a stepping motor, or the like can be used for the power change driving section 630, for example. A magnetic sensor using a Hall element, an MR element, or the like as well as an optical position detection sensor or the like can be used as the position detecting section 640, for example.

The power change control section 620 outputs the power change signal to the power change driving section 630, and displaces the power changing lens 610 in the optical axis direction. In this way, the space between the light receiving lens 210 and the power changing lens 610 changes, thereby changing the focal distance of the light receiving optical system.

The position detecting section 640 periodically detects the position of the power changing lens 610, and outputs a position signal. Which is a signal corresponding to this position, to the power change control section 620. The power change control section 620 performs feedback control of the drive amount of the power changing lens 610 according to the position signal of the power changing lens 610 acquired from the position detecting section 640.

The control section 800 perform is overall control of the distance measurement operation in the range finder 10. The control targets of the control section 800 include the light transmitting section 100, the light receiving section 200, the distance calculating section 700, and the like.

Figure 2:
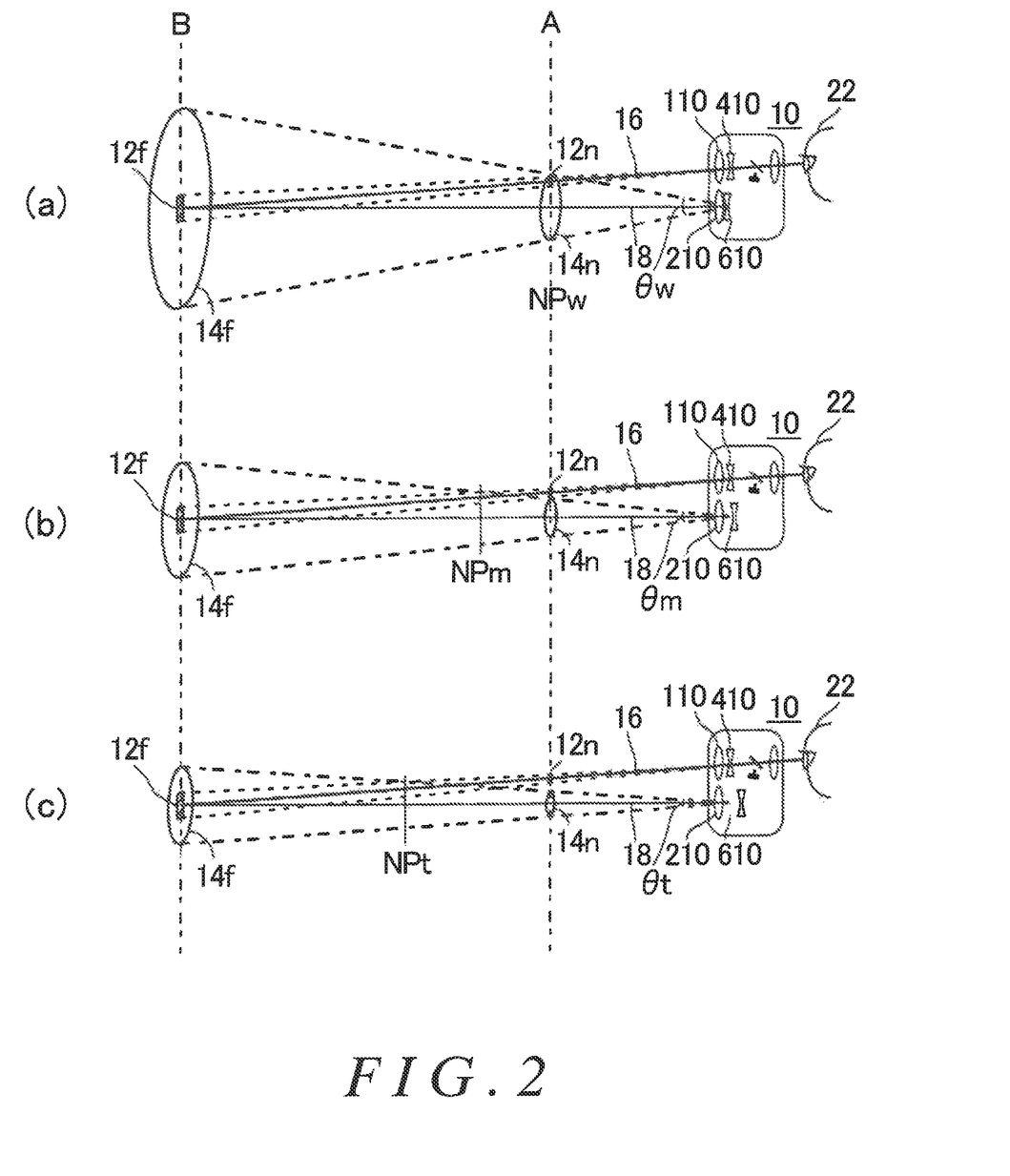
FIG. 2 is a drawing for describing the relationship between the light receiving region and the light irradiation region for each focal distance of the light receiving optical system in a state where there is no hand shake correction.

FIG. 2 is a drawing for describing the relationship between the light receiving region and the light irradiation region for each focal distance of the light receiving optical system in a state where there is no hand shake correction. Specifically, FIG. 2 shows a state in which the user 22 performs distance measurement using the range finder 10, Since the light transmitting section 100 and the sighting optical system 300 of the range finder 10 in the present embodiment have matching optical axes, the measurement light irradiates a sight position on the target object. The measurement light emitted from the objective lens 110 widens according to a specified irradiation angle to form light irradiation regions 12n and 12f at respective sight positions at location A and location B. In FIG. 2, location A and location B are representative locations that are respectively at a short distance and a long distance from the range finder 10.

The light receiving regions 14n and 14f indicate regions where the light receiving section 200 acquires light at location A and location B. The light receiving regions 14n and 14f are determined by the light reception angle θ and the distance to the target object. Here, the light reception angle θ is the acquisition angle of the light determined by the focal distance f of the light receiving lens 210 and the effective light receiving diameter of the light receiving element 230.

In FIG. 2, the light transmission center axis 16 indicates the center axis of the measurement light emitted from the light transmitting section 100 and the center axis of the angle of the light receiving section 200. The light reception center axis 18 indicates the center axis of the light acquired by the light receiving section 200, i.e. the optical axis of the light receiving optical system.

In FIG. 2, (a), (b), and (e) show the relationship between the light receiving region and the light irradiation region in cases where the focal distance f of the light receiving optical system is respectively fw, fm, and ft. Here, the fiscal distances of the light receiving optical system have a relationship such that ft>fm>fw. In the following description as well, the relationship between the magnitudes of the values of ft, fm, and fw remains unchanged.

In the range finder 10, the center of the light irradiation region 12f and the center of the light receiving region 14f are adjusted at location B to approximately match. Accordingly, at distances other than the distance at location B, the center of the light irradiation region and the center of the light receiving region do not match, causing a so-called parallax. In FIG. 2, the difference between the light transmission center axis 16 and the light reception center axis 18 is the parallax. At location A in FIG. 2, the center of the light irradiation region 12n moves from the center of the light receiving region 14n to the outside of the light receiving region 14n.

As shown in FIG. 2, the light reception angle θ becomes narrower when the focal distance f of the light receiving optical system is longer. Therefore, there is a relationship such that θw>θm>θt. Accordingly, at location A, for example, the diameter of the light receiving region 14n in (b) of FIG. 2 is larger than the diameter of the light receiving region 14n in (a) of FIG. 2.

It is possible to measure the distance with the range finder 10 when the light irradiation regions 12n and 12f are included in the light receiving regions 14n and 14f. As described above, the light reception angle θ becomes narrower when the focal distance f of the light receiving optical system is longer. Furthermore, as described above, a parallax P occurs at distances other than the distance at location B. Accordingly, as shown in FIG. 2, the near end NP of the range in which distance measurement by the range finder 10 is possible moves sequentially farther away in the order of NPw, NPm, and NPt as the focal distance f of the light receiving optical system becomes longer and the light reception angle θ becomes narrower in the order of (a), (b), and (c) of FIG. 2.

Figure 3:
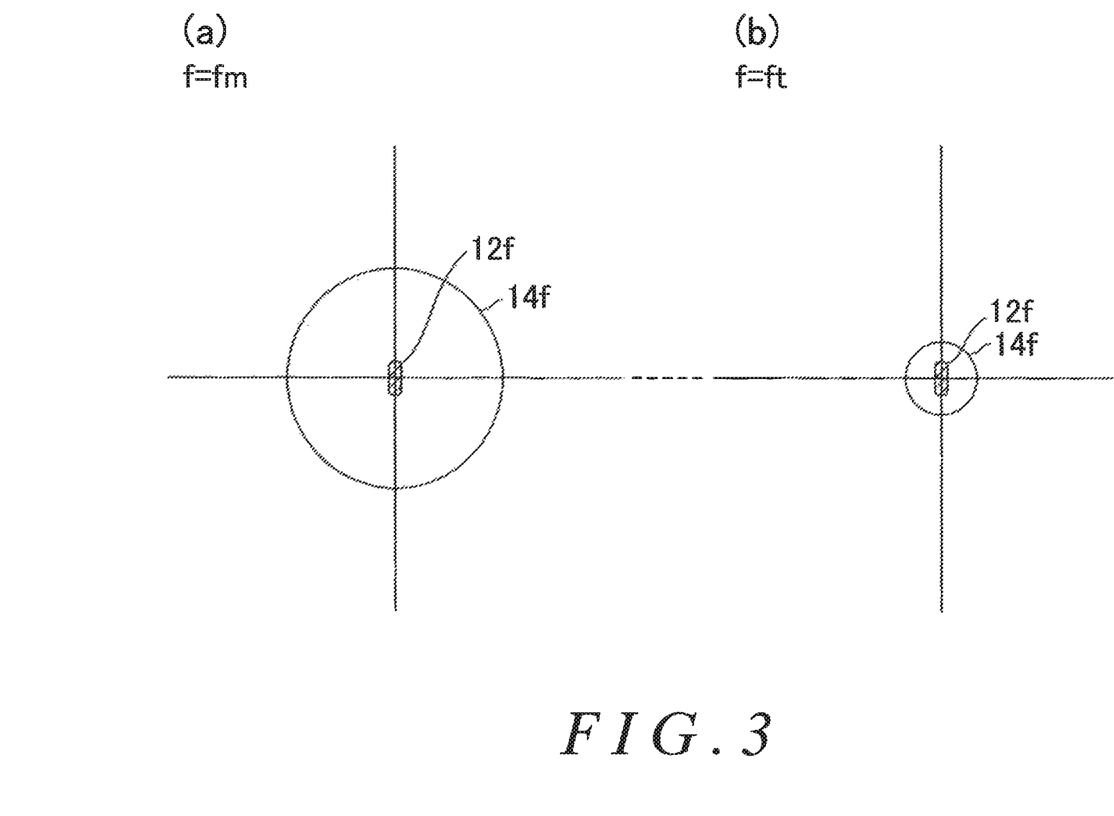
FIG. 3 shows a relationship between the light irradiation region and the light receiving region corresponding to the focal distance of the light receiving optical system.

FIG. 3 shows a relationship between the light irradiation region and the light receiving region corresponding to the focal distance of the light receiving optical system. Specifically, FIG. 3 shows the relationship between the light receiving region 14f and the light irradiation region 12f at location B shown in FIG. 2. In FIG. 3, (a) shows the state shown in (b) of FIG. 2, where the focal distance f of the light receiving optical system is fm. In FIG. 3, (b) shows the state shown in (c) of FIG. 2, where the focal distance f of the light receiving optical system is ft. As described above, due to the relationship with the focal distance f, the light receiving region 14f is narrower in (b) of FIG. 3 than in (a) of FIG. 3.

The accuracy of the distance measurement fluctuates according to the S/N ratio of the signal detected by the light receiving element 230. Here, the S/N ratio is the ratio of the signal level S corresponding to the measurement light in this signal to the signal level N corresponding to the external intruding light such as sunlight. Generally, there is a trend that the accuracy of the distance measurement is higher when the S/N ratio is larger.

The S/N ratio fluctuates according to the percentage of the light receiving region occupied by the light irradiation region. For example, when the percentage of the light receiving region 14f occupied by the light irradiation region 12f is relatively small, such as Shown in (a) of FIG. 3, the percentage of the amount of external intruding light acquired to the amount of measurement light is large, and therefore the S/N ratio is small. On the other hand, when the percentage of the light receiving region 14f occupied by the light irradiation region 12f is relatively large, such as shown in (b) of FIG. 3, the percentage of the amount of external intruding light acquired to the amount of measurement light is small, and therefore the S/N ratio is large.

Therefore, the range finder 10 in the present embodiment makes the focal distance f of the light receiving optical system longer when the S/N ratio is less than a predetermined threshold value. In this way, it is possible to increase the S/N ratio and improve the accuracy of the distance measurement for a target object that is particularly far away. The details are as described below.

Figure 4:
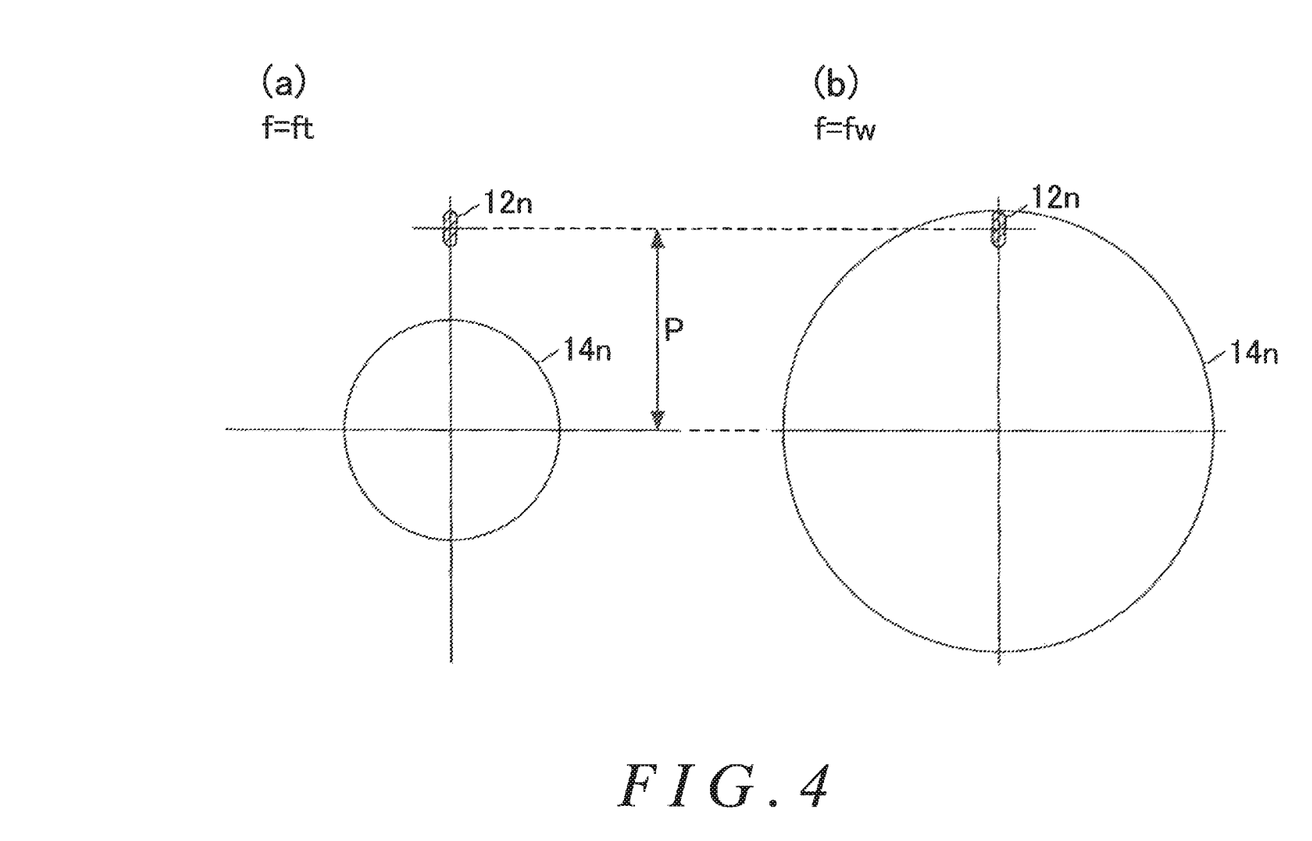
FIG. 4 shows a relationship between the light irradiation region and the light receiving region corresponding to the focal distance of the light receiving optical system.

FIG. 4 shows a relationship between the light irradiation region and the light receiving region corresponding to the focal distance of the light receiving optical system. Specifically, FIG. 4 shows the relationship between the light receiving region 14n and the light irradiation region 12n at location A shown in FIG. 2, In FIG. 4, (a) shows the state shown in (c) of FIG. 2, where the focal distance f of the light receiving optical system is ft. In FIG. 4, (b) shows the state shown in (a) of FIG. 2, where the focal distance f of the light receiving optical system is fw. As described above, due to the relationship with the focal distance f, the light receiving region 14n is wider in (b) of FIG. 4 than in (a) of FIG. 4.

In the description of FIG. 3, it was stated that since the light reception angle θ is narrower when the focal distance f of the light receiving optical system becomes longer, the percentage of the light receiving region occupied by the light irradiation region becomes large so that the S/N ratio becomes large, thereby improving the distance measurement accuracy.

However, as described in FIG. 2, since a parallax P occurs at distances other than the distance at location B, the center of the light irradiation region and the center of the light receiving region are skewed from each other. Therefore, according to the light reception angle θ of the light receiving optical system becoming narrower, the near end NP of the range in which the distance measurement by the range finder 10 is possible moves toward the far side.

In (a) of FIG. 4, the light irradiation region 12n is not included in the light receiving region 14n, and therefore the distance cannot be measured. On the other hand, in (b) of FIG. 4, the light irradiation region 12n is included in the light receiving region 14n, and therefore the distance can be measured. In this way, by controlling the focal distance f of the light receiving optical system to be short, it is possible to measure the distance for the target object that is a short distance away.

Therefore, in the present embodiment, the power changing section 600 controls the focal distance f of the light receiving optical system to be short when the distance to the target object is less than a predetermined threshold value.

Specifically, the power changing section 600 controls the focal distance f of the light receiving optical system such that all of the light irradiation region 12n is included in the light receiving region 14n. More specifically, the power changing section 600 controls the focal distance f such that the light reception angle θ (rad) of the light receiving optical system satisfies the expression shown below.

$$l \times 0 = \{(l \times \theta e)/2 + P\} \times 2$$

Here, l is the distance of the target object from the range finder, θe is the divergence angle (rad) of the measurement light, and P is the parallax.

In the present embodiment, the power changing section 600 controls the focal distance of the light receiving optical system based on the light reception results of the light receiving section 200. These light reception results include the S/N ratio and the distance calculated by the distance calculating section 700.

Figure 5:
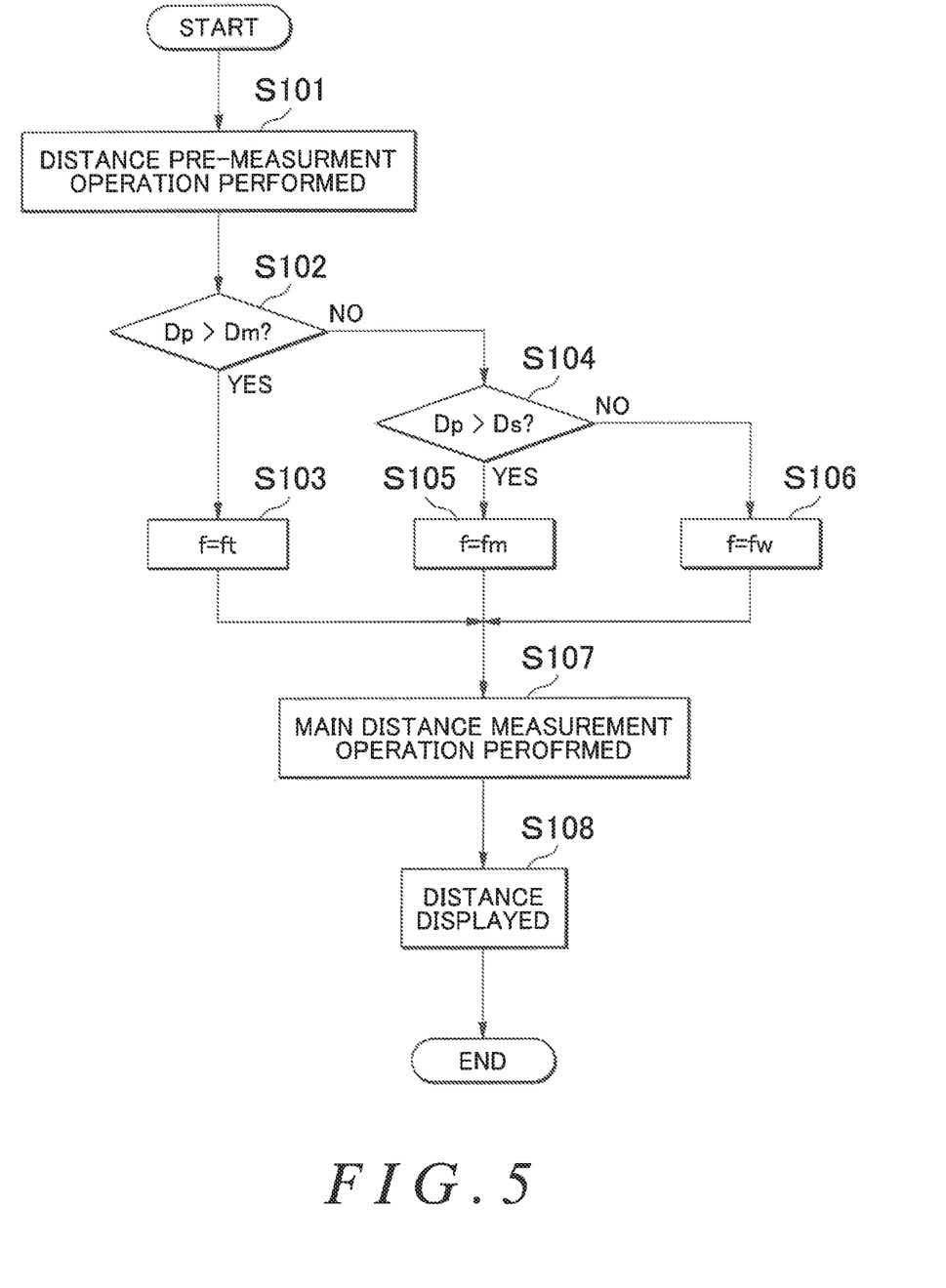
FIG. 5 is a flow chart showing an example of controlling the focal distance of the light receiving optical system according to the distance measurement results.

FIG. 5 is a flow chart showing an example of controlling the focal distance of the light receiving optical system according to the distance measurement results. In this flow, the power changing section 600 controls the focal distance f of the light receiving optical system such that the focal distance becomes a predetermined focal distance for predetermined distance ranges, based on the distance calculated in a distance pre-measurement operation. Three distance ranges, including a long distance range, a medium distance range, and a short distance range, are set as these predetermined distance ranges.

This flow is started in response to the distance measurement button 900 being pressed by the user and a distance measurement command being received by the control section 800, for example. The control section 800 starts the distance pre-measurement operation, and causes the distance calculating section 700 to calculate the distance Dp to the target object (S101). In the present embodiment, the distance pre-measurement operation refers to a distance measurement operation of measuring the distance to the target object before performing the main distance measurement operation, in order to determine a control standard for the focal distance. In this flow, the focal distance f of the light receiving optical system starts from a focal distance at the wide end, i.e. the shortest focal distance that can be achieved by the light receiving optical system.

The distance calculating section 700 outputs the information of the distance to the power changing section 600, via the control section 800. The power changing section 600 judges whether the distance Dp is greater than a predetermined threshold value Dm (S102). Here, the predetermined threshold value Dm is a threshold value for judging whether the target object is in a predetermined long distance range. If it is judged that the distance Dp is greater than the predetermined threshold value Dm (S102: YES), the power changing section 600 judges that the target object is in the long distance range and changes the focal distance of the light receiving optical system to be the predetermined focal distance ft (S103).

On the other hand, if it is judged that the distance Dp is not greater than the predetermined threshold value Dm (S102: NO), the power changing section 600 judges Whether the distance Dp is greater than a predetermined threshold value Ds (S104). Here, the predetermined threshold value Ds is a threshold value for judging whether the target object is in a predetermined short distance range or in a predetermined medium distance range. If it is judged that the distance Dp is greater than the predetermined threshold value Ds (S104: YES), the power changing section 600 judges that the target object is in the medium distance range and changes the focal distance of the light receiving optical system to be the predetermined focal distance fm (S105). If it is judged that the distance Dp is not greater than the predetermined threshold value Ds (S104: NO), the power changing section 600 judges that the target object is in the short distance range and changes the focal distance of the light receiving optical system to be the predetermined focal distance fw (S106).

When the changing of the focal distance of the light receiving optical system is completed, the power changing section 600 outputs to the control section 800 a power change completion signal indicating that the focal distance changing operation has been completed. When this power change completion signal is input, the control section 800 starts the main distance measurement operation and causes the distance calculating section 700 to calculate the distance to the target object (S107).

The control section 800 displays the distance calculated by the distance calculating section 700 in the reticle plate 320 (S108). After this, this flow is ended.

Figure 6:
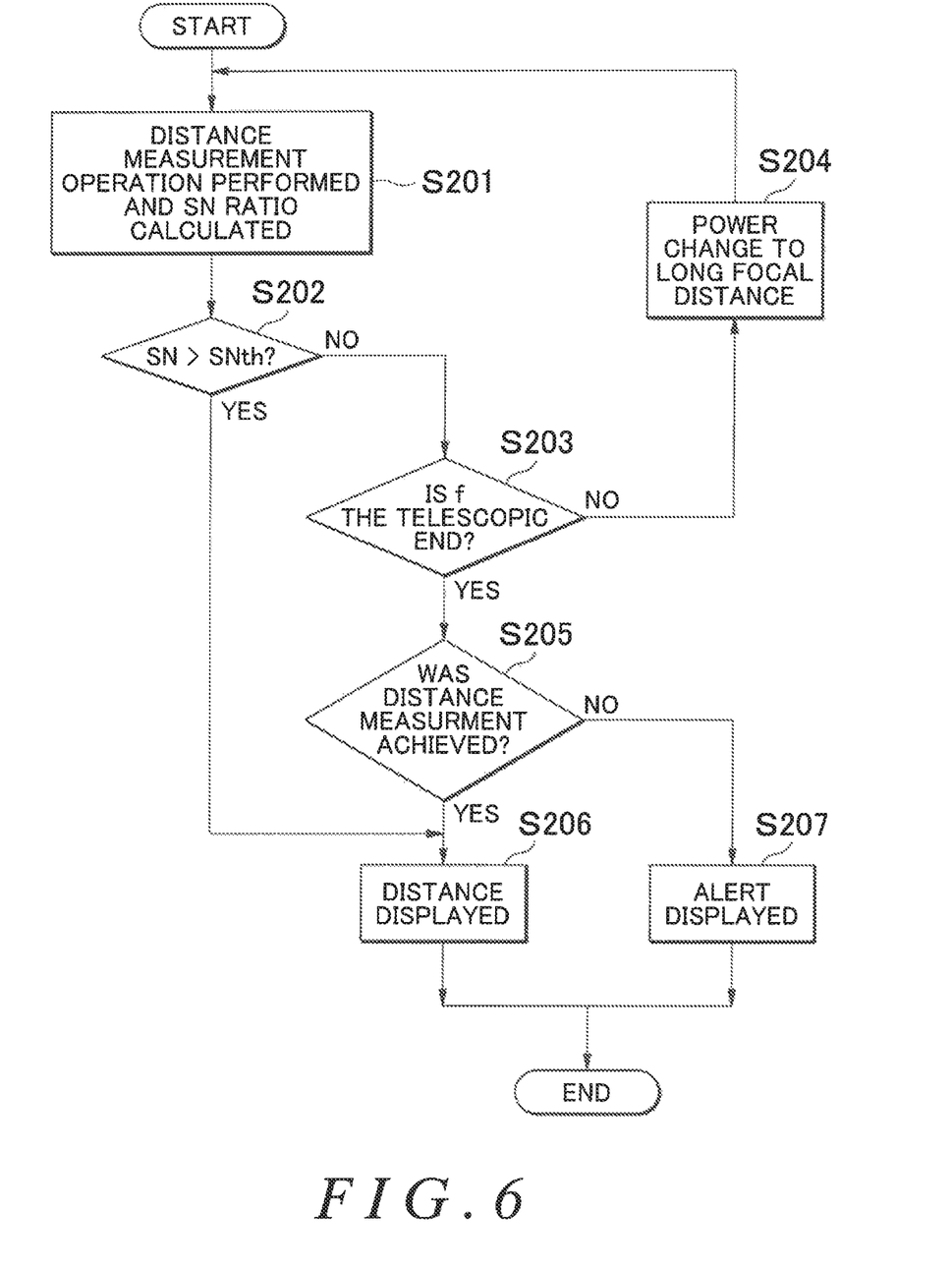
FIG. 6 is a flow chart showing another example of controlling the focal distance of the light receiving system according to the S/N ratio of the received light signal.

FIG. 6 is a flow chart showing another example of controlling the focal distance of the light receiving optical system according to the distance measurement results. In this flow, the power changing section 600 controls the focal distance of the light receiving optical system according to the S/N ratio of the received light signal detected in the distance pre-measurement operation.

This flow is started in response to the distance measurement button 900 being pressed by the user and a distance measurement command being received by the control section 800, for example. The control section 800 starts the distance measurement operation, and causes the distance calculating section 700 to calculate the S/N ratio and the distance to the target object (S201). In this flow, the focal distance of the light receiving optical system is started from the focal distance of the wide end.

The distance calculating section 700 outputs the information concerning the S/N ratio to the power changing section 600 via the control section 800. The power changing section 600 judges whether this S/N ratio is greater than a predetermined threshold value SNth (S202). If it is judged that the S/N ratio is greater than the predetermined threshold value SNth (S202: YES), the process moves to step S206. At this time, the power changing section 600 outputs to the control section 800 a signal indicating that the S/N ratio is greater than the predetermined threshold value SNth. When this signal is output, the control section 800 displays the distance calculated by the distance calculating section 700 in the reticle plate 320 (S206).

On the other hand, if it is judged that the S/N ratio is not greater than the predetermined threshold value SNth. (S202: NO), the power changing section 600 judges whether the current focal distance f of the light receiving optical system is the focal distance at the telescopic end, i.e. the longest focal distance that can be achieved by the light receiving optical system (S203).

If it is judged that the current focal distance f of the light receiving optical system is not the focal distance at the telescopic, end (S203: NO), the process moves to step S204 and the power changing section 600 lengthens the focal distance of the light receiving optical system by a predetermined value (S204). This predetermined value, which is an increment of the focal distance of the light receiving optical system, may be a value obtained by dividing the difference between the focal distance at the wide end and the focal distance at the telescopic end by 10, for example. The power changing section 600 then moves to step S201. At this time, the power changing section 600 outputs the power change completion signal to the control section 800. When this power change completion signal is input, the control section 800 again starts the distance measurement operation.

On the other hand, if it is judged that the current focal distance f of the light receiving optical system is the focal distance at the telescopic end (S203: YES), the power changing section 600 outputs to the control section 800 a power change limitation signal indicating that the focal distance f has reaches the telescopic end. When this power change limitation signal is output, the control section 800 judges whether the distance measurement result has been obtained (S205). For example, in a case where the predetermined number of pulses cannot be detected in one instance of the distance measurement operation due to a low S/N ratio, the distance calculating section 700 outputs 0 as the distance measurement result.

When 0 is output from the distance calculating section 700 as the distance measurement result, the control section 800 judges that the measurement result could not be acquired. On the other hand, when a value other than 0 is output from the distance calculating section 700 as the distance measurement result, the control section 800 judges that a measurement result has been acquired.

If it is judged that the measurement result has been acquired (S205: YES), the control section 800 displays the distance calculated by the distance calculating section 700 in the reticle plate 320 (S206). On the other hand, if it is judged that a measurement result has not been acquired (S205: NO), the control section 800 displays an alert indicating that the distance measurement failed in the reticle plate 320 (S207). When the operation described above is completed, this flow is ended.

Figure 7:
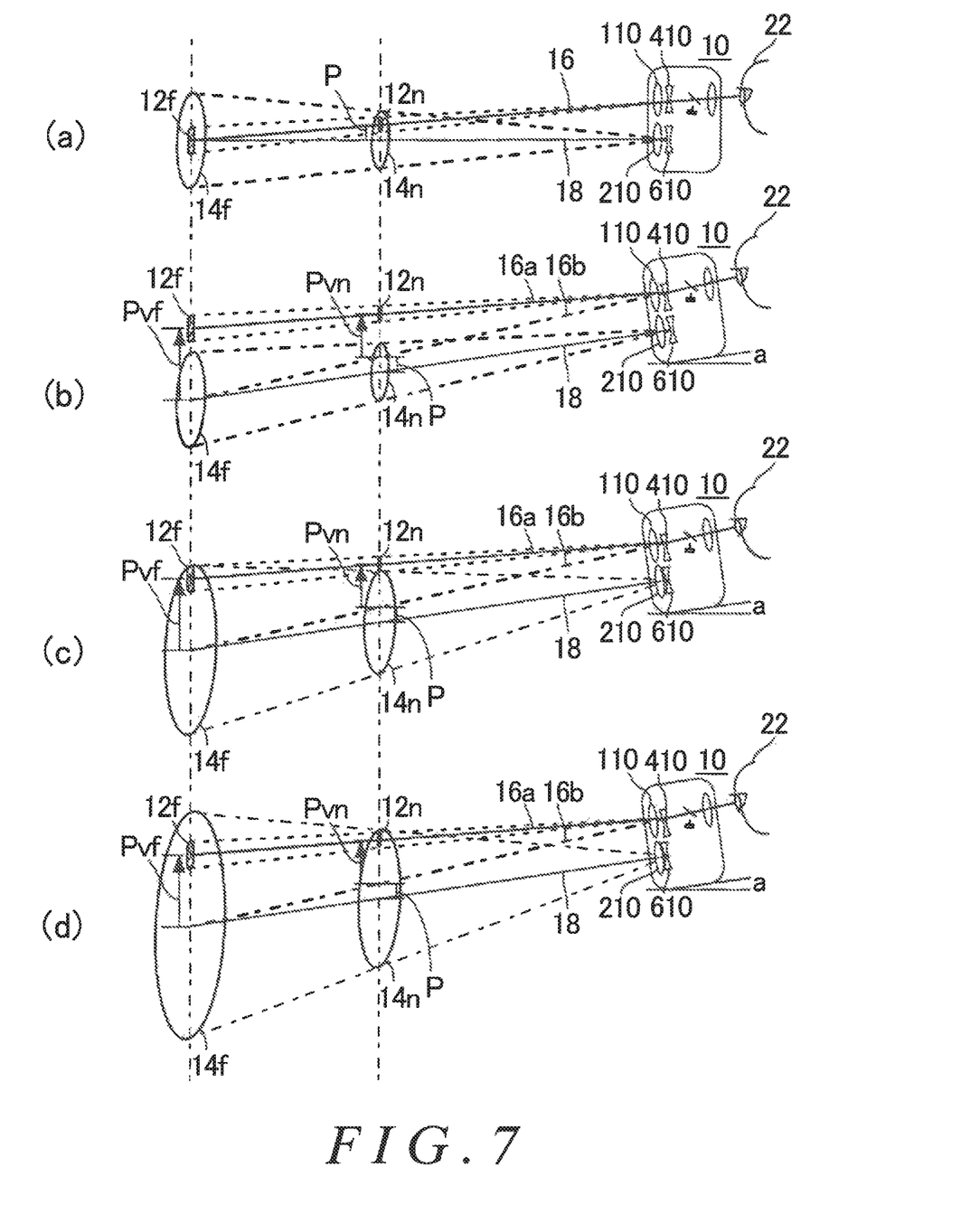
FIG. 7 is a drawing for describing the relationship between the light receiving region and the light irradiation region for each focal distance of the light receiving optical system when a hand shake correction is performed.

FIG. 7 is a drawing for describing the relationship between the light receiving region and the light irradiation region for each focal distance of the light receiving optical system when a hand shake correction is performed. Components that are the same as in FIG. 2 are given the same reference numerals, and the description of content that would be redundant in light of the description relating to FIG. 2 is omitted.

In FIG. 7, (a) shows a state in which hand shaking does not occur during the distance measuring operation. In FIG. 7, (b) to (d) shows states in which pitching with an angle "a" around the center of the range finder 10 occurs due to hand shaking during the distance measurement operation. Due to the hand shake correction of the correcting section 500, the light irradiation regions 12n and 12f maintain the same positions respectively at location A and location B.

In FIG. 7, the light transmission center axis 16b indicates the center axis of the measurement light before the hand shake correction operation is performed. Furthermore, the light transmission center axis 16a indicates the center axis of the measurement light after the hand shake correction operation has been performed. The light reception center axis 18a indicates the optical axis of the light receiving optical system after the hand shake correction has been performed.

In (a) and (b) of FIG. 7, the focal distance f of the light receiving optical system is ft. In (c) and (d) of FIG. 7, the focal distances f of the light receiving optical system are respectively fm and fw.

In (a) of FIG. 7, there is no parallax at location B. On the other hand, at location A, there is a parallax P. In (b) to (d) of FIG. 7, a parallax Pvf occurs at location B due to the hand shake correction operation. Furthermore, a parallax Pvn occurs at location A as well, and the total amount of the parallax is P+Pvn.

As understood from (b) to (d) in FIG. 7, in the range finder 10 according to the present embodiment, the correction amount for the optical axes of the light transmitting section 100 and the sighting optical system 300 corresponds to the difference between the light transmission center axis 16a and the light transmission center axis 16b. Accordingly, the correction amount for these optical axes is equivalent to the parallaxes Pvn and Pvf.

At location B in FIG. 7, when the focal distance f of the light receiving optical system is not changed to fin due to the effect of the parallax Pvf occurring because of the hand shake correction operation, the light receiving region 14f is not included in the light irradiation region 12f, and therefore the distance cannot be measured. Furthermore, at location A, when the focal distance f of the light receiving optical system is not changed to fw due to the effect of the parallax Pvn occurring because of the hand shake correction operation, the light receiving region 14n is not included in the light irradiation region 12n, and therefore the distance cannot be measured. In this way, it is necessary to make the focal distance f of the light receiving optical system shorter when the distance to the target object is shorter.

Therefore, in the present embodiment, the power changing section 600 controls the focal distance of the optical system of the light receiving section 200 based on the distance calculated by the distance calculating section 700 and the correction amount of the optical axis corrected by the correcting section 500. In this case, since the correction amount of the optical axis corresponds to the drive amount of the correcting lens 510, the power changing section 600 controls the focal distance based on the distance described above and the drive amount of the correcting lens 510. The power changing section 600 controls the focal distance f of the light receiving optical system such that all of the light irradiation region is included in the light receiving region. In this way, even during the hand shake correction operation performed for a relatively large amount of shaking, it is possible to stably measure the distance.

In this case, in the same manner as in the flow described in FIG. 5, the distance to the target object is calculated using the distance pre-measurement operation before the main distance measurement is performed. The power changing section 600 calculates the focal distance f from this distance and the drive amount, and drives the power changing lens 610 in a manner to realize this focal distance. After this, the main distance measurement operation is performed.

Instead of controlling the focal distance based on both the drive amount and the distance, the power changing section 600 may control the focal distance based on the drive amount regardless of the distance to the target object. In this case, the power changing section 600 shortens the focal distance of the light receiving optical system when the drive amount is larger. In this way, the power changing section 600 controls the focal distance f of the light receiving optical system such that all of the light irradiation region is included in the light receiving region.

In FIG. 1 described above, the objective lens 110, the light receiving lens 210, the eyepiece lens 310, the correcting lens 510, and the power changing lens 610 are each represented by a single lens. However, these lenses may each include a plurality of lenses.

Instead of emitting infrared rays, the light emitting section 130 may emit ultraviolet rays. In this case, a component corresponding to ultraviolet rays is also used as the dichroic reflective surface 122 of the erecting prism 120, In the above description, the correcting lens 510 is used as the optical component for correcting the optical axis skew in the sighting optical system 300, but the erecting prism 120 may be used instead of the correcting lens 510. Furthermore, as another correcting member, a variable-apex-angle prism or the like that can change the apex angle formed by the surface of incidence and the surface of emission by pivoting the components forming the surface of incidence and the surface of emission may be used.

In the above description, the power changing section 600 controls the focal distance of the light receiving optical system such that all of the light irradiation region is included in the light receiving region, but instead the power changing section 600 may control this focal distance such that at least a portion of the light irradiation region enters into the light receiving region. For example, the power changing section 600 may control this focal distance such that half of the light irradiation region enters into the light receiving region. Furthermore, a determination concerning how much of the light receiving region is to be included in the light irradiation region as a result of the control of this focal distance may be made according to the distance to the target object.

In the above description, the distance to the target object may be calculated in the distance pre-measurement operation using a smaller number of light pulses than is used in the normal distance measurement operation.

The above description uses an example of calculating distance using a histogram obtained by integrating signal values of time differences. However, the present invention is not limited to this, and may be applied to a case where a histogram is not used, such as a case of calculating the distance from an average value of the signal values of the time differences.

The above description relates to a so-called two-lens-type of range finder in which the light transmitting section 100 and the sighting optical system 300 have a common optical axis. However, the same processes and control can be applied to a so-called three-lens-type of range finder in which the light transmitting section 100, the light receiving section 200, and the sighting optical system 300 each have a different optical axis.

In the above description, the power changing section 600 controls the focal distance of the light receiving optical system according to the drive amount indicated by the correction signal output from the drive amount calculating section 530, but may instead control the focal distance of the light receiving optical system according to the magnitude of the shaking amount indicated by the shaking detection signal output from the shake detecting section 400. Furthermore, the power changing section 600 may control the focal distance of the light receiving optical system according to the position of the correcting lens 510 periodically detected by the correction control section 520 functioning as the position detecting section or according to the movement amount from an initial position that can be calculated from this position of the correcting lens 510.

The above description uses an example in which the power changing section 600 controls the focal distance of the light receiving optical system according to the S/N ratio of the received light signal, but the power changing section 600 may instead control the focal distance of the light receiving optical system according to a noise value of the received light signal. For example, the power changing section 600 may control the focal distance of the light receiving optical system to be longer when the noise value is larger.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: range finder, 12n, 12f: light irradiation region, 14n, 14f: light receiving region, 16, 16a, 16b: light transmission center axis, 18, 18a: light reception center axis, 22: user, 100: light transmitting section, 110: objective lens, 120: erecting prism, 122: dichroic reflective surface, 124, 126: completely reflective surface, 130: light emitting section, 200: light receiving section, 210: light receiving lens, 220: band transmission filter, 230: light receiving element, 300: sighting optical system, 310: eyepiece lens, 320: reticle plate, 400: shake detecting section, 500: correcting section, 510: correcting lens, 520: correction control section, 530: drive amount calculating section, 600: power changing section, 610: power changing lens, 620: power change control section, 630: power change driving section, 640: position detecting section, 700: distance calculating section, 800: control section, 900: distance measurement button

What is claimed is:

1. A range finder comprising:
    a light transmitting section that includes a first correcting member for correcting image blur and emits measurement light to a sighting target;
    a light receiving section that receives returned light from the sighting target and outputs a received light signal;
    a driving section that drives the first correcting member;
    a second correcting member that causes the measurement light, which proceeds in an inclined manner due to driving of the first correcting member, to be incident to the light receiving section; and
    a power changing section that drives the second correcting member, and that controls a focal distance of light receiving section.

2. The range finder according to claim 1, comprising:
    a drive amount calculating section that calculates a drive amount for driving the first correcting member based on a shaking amount applied to the range finder, wherein
    the power changing section controls a focal distance of the light receiving section based on the drive amount of the first correcting member calculated by the drive amount calculating section.

3. The range finder according to claim 1, comprising:
a drive amount calculating section that calculates a drive amount for driving the first correcting member based on a shaking amount applied to the range finder,
a position detecting section that detects a position of the first correcting member that is driven based on the calculated drive amount, wherein
the power changing section controls a focal distance of the light receiving section based on at least one of the drive amount calculated by the drive amount calculating section and the position detected by the position detecting section.

4. The range finder according to claim 3, wherein
the power changing section makes the focal distance of the light receiving section shorter when at least one of the shaking amount, the drive amount, and a movement amount from an initial position of the first correcting member is larger.

5. The range finder according to any one of claim 1, comprising:
a distance calculating section that calculates distance based on a time from when the measurement light is transmitted to when the measurement light is received, wherein
the power changing section controls a focal distance of the light receiving section further based on the distance calculated by the distance calculating section.

6. The range finder according to claim 5, further comprising:
a control section that controls the focal distance of the light receiving section once using the power changing section, based on the distance, and then causes the distance calculating section to again calculate and output the distance.

7. The range finder according to claim 5, wherein
the power changing section makes the focal distance of the light receiving section shorter when the distance calculated by the distance calculating section is less than a predetermined threshold value.

8. A range finder comprising:
a sighting optical system that includes a first correcting member for correcting image blur and sights a target object;
a light transmitting section that emits measurement light to a sighting target;
a light receiving section that receives returned light from the sighting target and outputs a received light signal;
a driving section that drives the first correcting member;
a second correcting member that causes the measurement light, which proceeds in an inclined manner due to driving of the first correcting member, to be incident to the light receiving section;
a power calculating station that drives the second correcting member, and that controls a focal distance of the light receiving section; and
a distance calculating section that calculates distance based on a time from when the measurement light is transmitted to when the measurement light is received.

9. The range finder according to claim 1, wherein
in response to a light irradiation region where the measurement light is irradiated not being included in a light receiving region where the light receiving section acquires light, at a distance of the sighting target, the power changing section controls the focal distance of the light receiving section such that the light irradiation region is included in the light receiving region, at the distance.

* * * * *